April 19, 1932.   J. E. ELMS   1,854,465

PISTON

Filed March 8, 1930

Inventor

J. E. Elms

By Jack A. Ashley
Attorney

Patented Apr. 19, 1932

1,854,465

UNITED STATES PATENT OFFICE

JOHN E. ELMS, OF DALLAS, TEXAS, ASSIGNOR TO A. R. THOMASSON, OF DALLAS, TEXAS

PISTON

Application filed March 8, 1930. Serial No. 434,365.

This invention relates to new and useful improvements in pistons.

One object of the invention is to provide certain improvements in pump pistons.

A particular object of the invention is to provide a piston of long life which may be economically maintained.

Another object of the invention is to provide a piston having a plurality of elastic rings and separators so arranged as to wipe the liner or cylinder wall clean when pulling against a head pressure and also to seat and prevent bypassing of the pressure fluid.

Still another object of the invention is to provide elastic rings so arranged as to be seated against the cylinder wall by the pressure fluid and disposed in such successive order as to arrest the fluid should it bypass one or more of the rings.

Another object of the invention is to so mount and dispose elastic piston rings as to prevent the pressure fluid from working in behind and distorting said rings so as to produce abnormal wear.

An important object of the invention is to provide elastic rings having circumferential lips directed toward the pressure fluid at each end of the piston and sealed thereby.

A construction designed to carry out the invention will be hereinafter described, together with other features of the invention.

Figure 1:
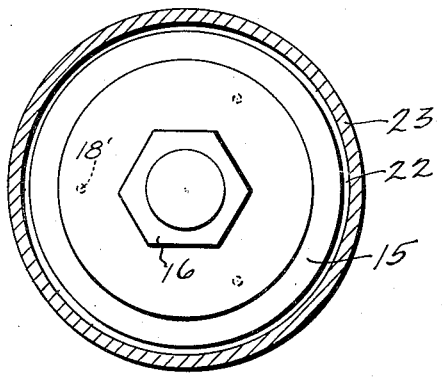
Figure 4:
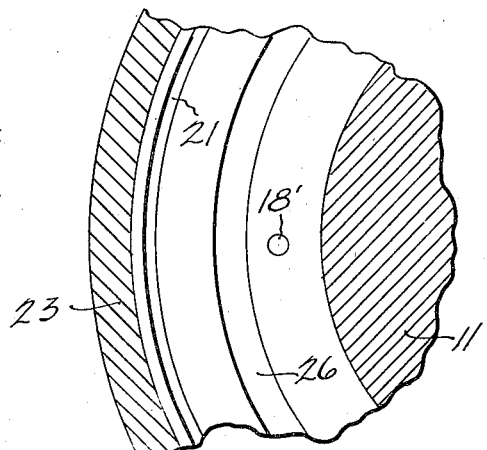
Figure 2:
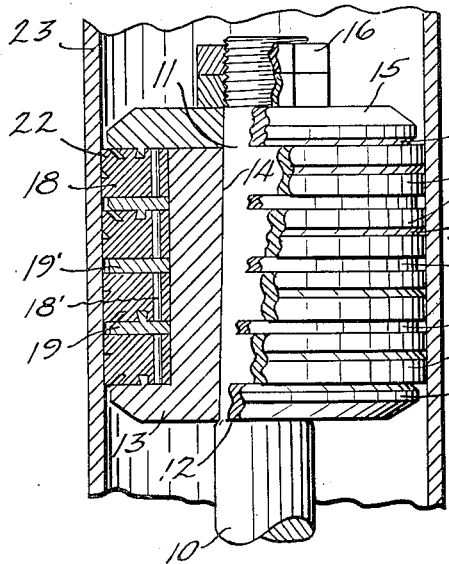
Figure 3:
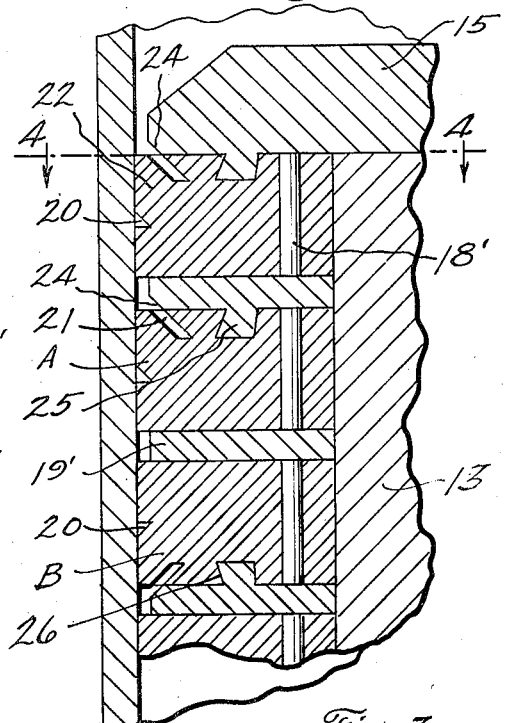

The invention will be more readily understood from a reading of the following specification and by reference to the accompanying drawings in which an example of the invention is shown, and wherein:

Figure 1 is an end elevation of a piston constructed in accordance with my invention, the pump liner being shown in cross-section, Figure 2 is a view of the same, partly in elevation and partly in section, Figure 3 is an enlarged partial longitudinal sectional view, and Figure 4 is a cross-sectional view taken on the line 4—4 of Figure 3.

In the drawings the numeral 10 designates a piston rod having a tapered shank 11 on which the piston is mounted. The shank is provided with an annular shoulder 12 for receiving a piston head 13 having a tapered axial bore 14 snugly fitting on the shank and abutting the shoulder. A cap or end plate 15 also fits on the shank against the end of the head and is confined by jam nuts 16 on the screw-threaded end of said shank.

The cap plate 15 produces an annular flange complementary to an annular flange 17 on the opposite end of the head and between these flanges elastic piston rings 18 and metallic spacers 19 are mounted on the head. It is preferable to employ an equal number of piston rings and dispose the same on opposite sides of a central spacer 19'. All of the spacers are made in the form of circular collars snugly fitting on the head, but slidable thereof. Those piston rings mounted on one side of the central spacer are designated A, and those fitting on the opposite side are designated B. The piston rings are snugly mounted on the head so that no space is provided therebetween.

Each piston ring has a circumferential or peripheral groove 20 which is given a substantially V-shape in cross-section, as is best shown in Figure 3. In one side of the piston ring is provided an inclined annular recess 21 disposed inwardly a short distance from the peripheral edge of the ring. By reason of the groove 20 and the recess 21, an annular sealing lip 22 is formed therebetween. It is obvious that the pressure fluid entering the recesses 21 will force the annular face of the lip into contact with the cylindrical wall of the cylinder or liner 23, the said face being coincident with the periphery of the ring.

The plate 15 and the flange 17, as well as the spacers, are considerably less in diameter than the inner diameter of the liner so as to permit the rings 18 to project and engage said liner. The spacers 19 and the flanges 15 and 17 have bevelled edges 24 flush with the recesses 21 so as to permit the pressure fluid to readily enter the same. The rings A have their recesses on the side nearest the flange 15, whereby the lips 22 thereof are directed toward that end of the piston, while the rings B have their recesses 21 directed toward the flange 17 and their lips on that side nearest said flanges.

It will be obvious that by oppositely directing the recesses 21 they will be subjected to a head pressure as the piston reciprocates. In illustration of this, it is pointed out that when the piston is moved in the direction contiguous to the flange 15 the lips 22 of the ring will be forced against the liner wall by the pressure fluid entering the recesses 21, while the lips 22 of the rings B will drag the walls, but will also be subjected to any trailing or following pressure. Upon the reverse stroke the action will be reversed. It is contemplated that the first lip will effectually prevent bypassing, but should it fail, the second lip will arrest such passage.

In order to prevent the pressure fluid from passing between the sides of the piston rings 18 and the flanges 15 and 17 and also between the rings and the spacers 19 and getting in behind the rings, the parts 15, 17 and 19 are provided with annular ribs 25. These ribs are more or less dovetailed in cross-section and fit into complementary grooves 26 in the sides of the rings.

It will be seen that the grooves 20 will keep the elastic rings 18, which are preferably of rubber or rubber compound, from bulging circumferentially when under pressure. Where the device is used as a pump plunger, as for instance in slush pumps, on a pull against pressure the pressure fluid on the side of the piston will enter the recesses 21 and expand the lips 22. This not only assures a fluid-tight seal, but cleans the wall of the liner or cylinder. To prevent undue wear and distortion of the rings 18, stay pins 18' are embedded transversely in each ring so as to engage the parts 15, 17 and 19 when the rings are secured in place.

Various changes in the size and shape of the different parts, as well as modifications and alterations, may be made within the scope of the appended claim.

What I claim is:

A piston comprising a head, resilient non-metallic rings snugly mounted thereon, said rings having flexible annular peripheral lips for sealing against the cylinder wall, spacers on the head separating the rings, and transverse metal pins embedded in the rings to prevent distortion thereof.

In testimony whereof I affix my signature.

JOHN E. ELMS.